United States Patent [19]

McFarland

[11] Patent Number: 5,570,462
[45] Date of Patent: Oct. 29, 1996

[54] SYSTEM AND METHOD FOR OBJECT PLACEMENT AND SIZING IN A DYNAMIC DISPLAY ENVIRONMENT

[75] Inventor: Max McFarland, Cupertino, Calif.

[73] Assignee: Apple Computer, Inc., Cupertino, Calif.

[21] Appl. No.: 435,386

[22] Filed: May 5, 1995

[51] Int. Cl.$^6$ .................................................. G06T 3/00
[52] U.S. Cl. ............................................. 395/136; 395/133
[58] Field of Search ..................... 395/136, 133, 395/138, 139, 155, 161, 162; 345/1, 3, 5

[56] References Cited

U.S. PATENT DOCUMENTS

| 4,377,000 | 3/1983 | Staab | 371/11 |
|---|---|---|---|
| 4,855,728 | 8/1989 | Mano et al. | 340/805 |
| 4,860,246 | 8/1989 | Inoue | 364/DIG. 2 |
| 4,926,166 | 5/1990 | Fujisawa et al. | 340/717 |
| 4,980,678 | 12/1990 | Zenda | 340/716 |
| 4,990,904 | 2/1991 | Zenda | 382/47 X |
| 5,159,683 | 10/1992 | Lvovsky et al. | 395/100 |
| 5,257,350 | 10/1993 | Howard et al. | 395/162 |
| 5,276,630 | 1/1994 | Baldwin et al. | 364/505 |
| 5,282,268 | 1/1994 | Mieras et al. | 395/164 |
| 5,379,376 | 1/1995 | Bednowitz | 395/133 X |
| 5,426,723 | 6/1995 | Horsley | 395/133 |
| 5,459,825 | 10/1995 | Anderson et al. | 395/133 |

Primary Examiner—Almis R. Jankus
Attorney, Agent, or Firm—Burns, Doane, Swecker & Mathis, L.L.P.

[57] ABSTRACT

A system for updating the location of elements in a computer display, upon a change in the size and/or configuration of the display, that relocates objects originally rendered on a display device which has been moved or resized in a location which preserves the original, visual appearance of objects handled by that display device. A move vector is determined which quantifies movement of a display device origin. A scale vector is determined which quantifies changes in display device size to proportionalize movement for each object. Together, these two vectors indicate a placement position for a relocated object.

14 Claims, 3 Drawing Sheets

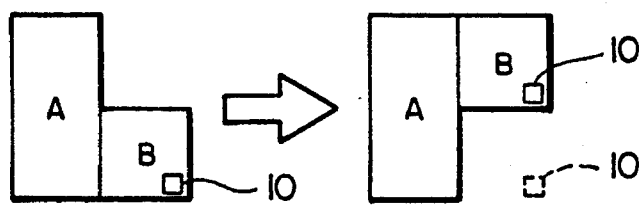
FIG_1
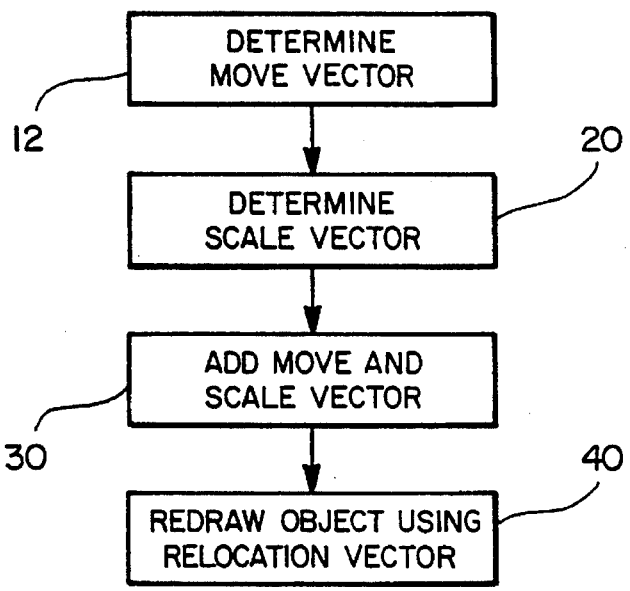
FIG_2
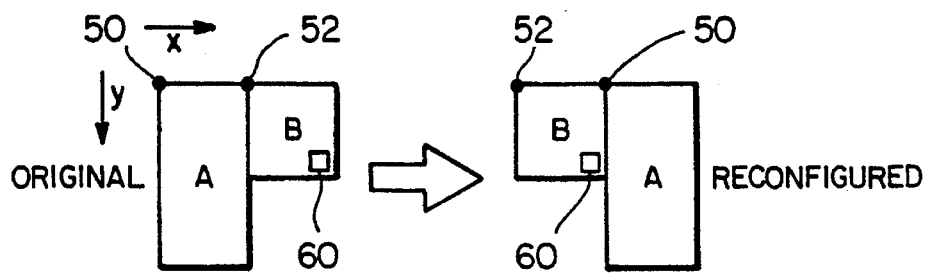
FIG_3

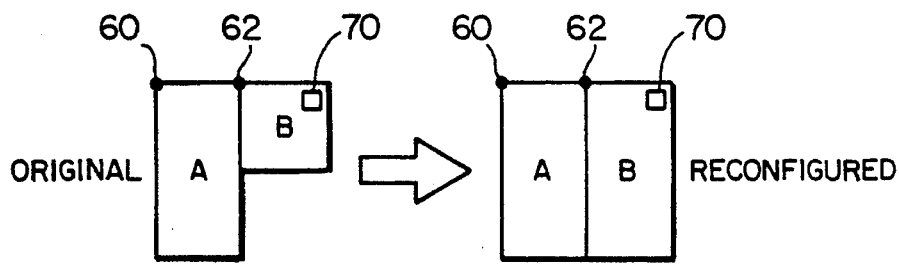
FIG_4
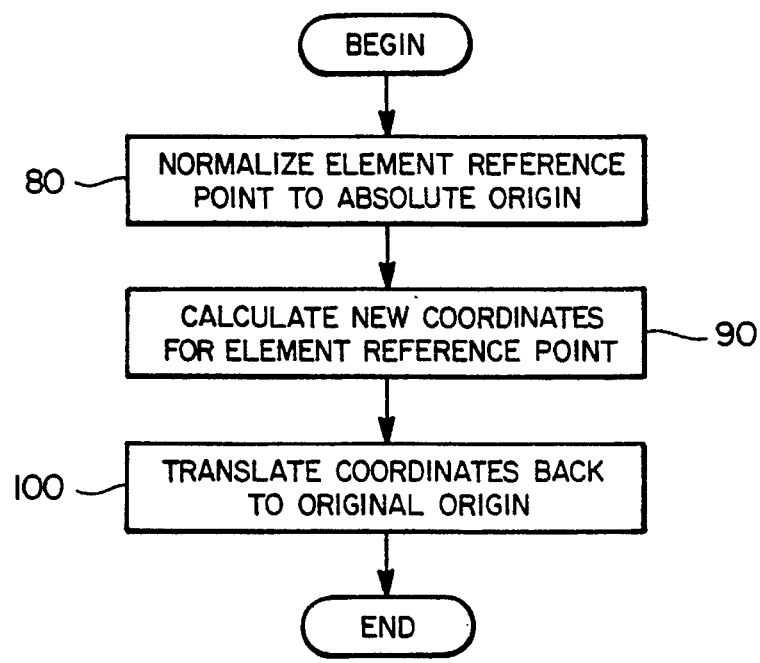
FIG_5
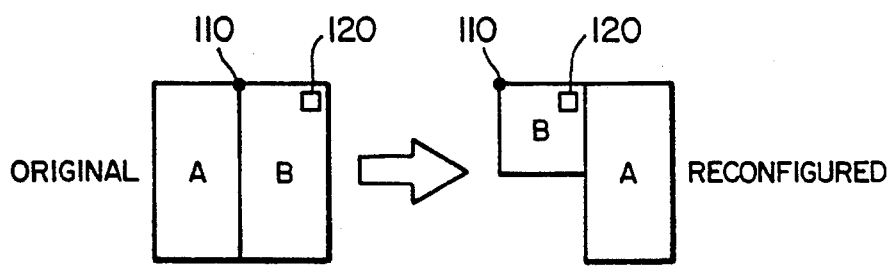
FIG_6

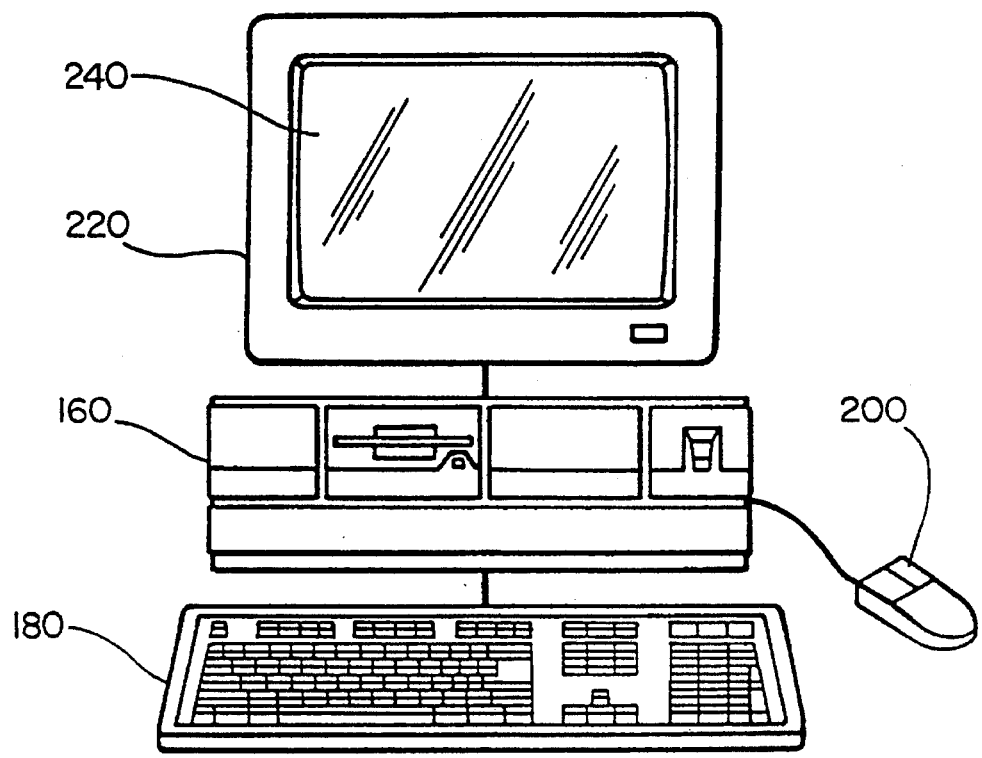
FIG_7
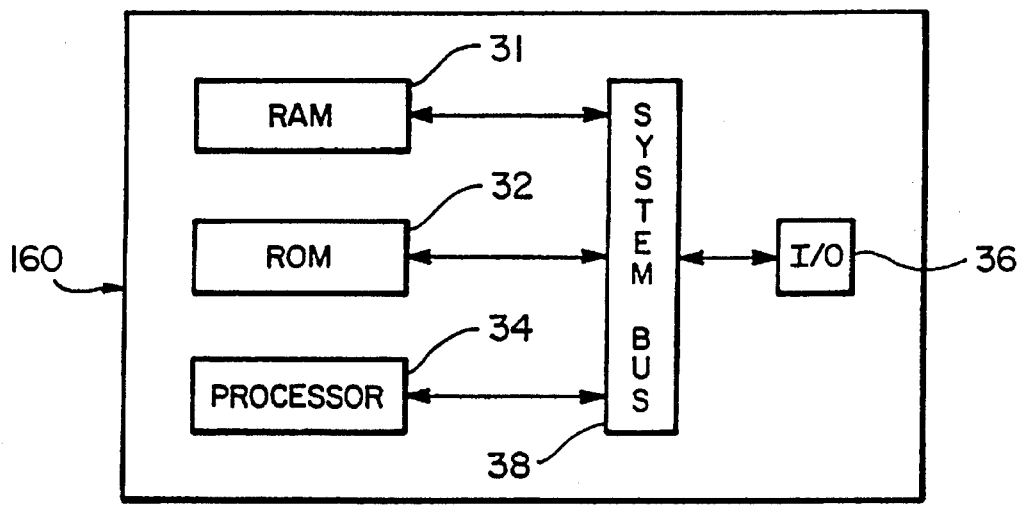
FIG_8

5,570,462

SYSTEM AND METHOD FOR OBJECT PLACEMENT AND SIZING IN A DYNAMIC DISPLAY ENVIRONMENT

RELATED APPLICATIONS

The present application is related to U.S. patent application Ser. No. 08/209,276 entitled "System for Updating Computer Displays Upon Reconfiguration" to Ian Hendry et al. and to U.S. patent application Ser. No. 08/209,275 entitled "System for Managing the Display of Information in a Computer" to Ian Hendry, both of which were filed on Mar. 14, 1994 and both of which are incorporated here by reference.

BACKGROUND

The present invention is directed to the display of information on one or more computer display devices, and more particularly to the updating of displayed information upon display device reconfiguration.

In the modern computing environment, the user is presented with a variety of choices for displaying information processed within the computer. Display devices come in a wide choice of sizes, and many offer different display modes with varying resolutions. If the user switches from one display device to another, it may be necessary to update the displayed information to accommodate the size and/or characteristics of the new device. Similarly, for display devices that are capable of operating in multiple modes, an update may be required when switching from one mode to another. For example, in one mode the device may provide a display that is 640 pixels wide and 480 pixels high, and in another mode the width of the display might be 1,024 pixels and its height can be 768 pixels.

Whenever a change in display configuration occurs, the elements of the display might be placed at different locations relative to the overall shape of the display. These changes are particularly noticeable in graphical interfaces which employ a desktop metaphor to identify objects and applications for the user. In graphical interfaces which employ this type of metaphor, files, application programs and other objects are represented as icons that can be placed on the desktop by the user. A typical user may prefer to group the icons on the desktop in a manner which identifies their relationship to one another. For example, utility applications may be placed in one area of the desktop, files in another, and other application programs in a third area. If the display changes, the icons may appear in different portions of the overall display. For example, an icon located at the right edge of a 640 pixel wide display screen would be positioned near the center of the screen if the display is switched to a width of 1,024 pixels. Conversely, an icon on the right edge of a display having a width of 1,024 pixels would be positioned off the display if the display is changed to the 640 pixel mode. In the past, when the size of a display changed, icons that would otherwise be positioned off the display would instead be relocated to default positions on the new display. For example, these icons might be located along the right edge of the display, beginning at the top right corner.

Another change in configuration can occur when a one of plural display devices, already configured as part of the display space, is moved relative to the other display device(s). As in the previous reconfiguration examples, it may also be desirable in these situations to relocate desktop objects to the moved display device so that the original visual relationship between objects on this device is preserved. A common example of this type of reconfiguration occurs when a user elevates one device, for example a 13-inch monitor, relative to another, for example a 21-inch monitor, so that the cursor moves across these two monitors in a straight line. This reconfiguration situation is pictorially illustrated in FIG. 1. Therein, an original display space configuration is shown to the left of the arrow wherein a larger monitor A is abutted on a right side thereof by a smaller monitor B. The smaller monitor B has, for example, an icon 10 drawn in the lower right hand portion thereof. If a user reconfigures this display space in the manner illustrated to the right of the arrow in FIG. 1, i.e., by elevating monitor B, then it would be desirable to relocate icon 10 from its old position (as shown by the dotted outline of icon 10) to a same relative position on the moved monitor B (shown by the solid outline of icon 10). Absent any relocation, icon 10 would seem to disappear from the user's desktop.

SUMMARY

According to exemplary embodiments of the present invention, desktop objects can be relocated from an original position in a display space to a new position to recreate the original visual appearance of those objects in the new display space configuration. This can be accomplished, for example, by determining a move vector and/or a scale vector associated with the reconfiguration of the display space. According to one exemplary embodiment, when a display device is moved (logically or physically) from an original location to a new location, a move vector is calculated which quantifies the movement of an origin of that device. Additionally, when the display size of the device (logical or physical) changes, a scale vector is determined for each object that uniquely quantifies a magnitude and direction of movement of that object from its old position to a corresponding new position on the resized display device. By adding these two vectors together and using the resultant relocation vector, each of the objects rendered on the display device in its original location and/or size will be redrawn on that device in its new configuration to provide a similar visual appearance of the portion of the display space handled by that device after it has been moved or resized.

BRIEF DESCRIPTION OF THE DRAWINGS

The foregoing, and other, objects, advantages and features of the present invention will become more apparent upon reading the following detailed description in conjunction with the appended figures in which:

FIG. 1 illustrates an example in which a monitor configuration has changed, and in which it is desirable to update the display space;

FIG. 2 is a flowchart which illustrates an overall method for placing objects according to an exemplary embodiment of the present invention;

FIG. 3 illustrates an exemplary display reconfiguration used to describe exemplary embodiments of the present invention;

FIG. 4 illustrates another example of change in display space, and the manner in which the present invention applies thereto;

FIG. 5 is a flowchart which illustrates an exemplary method for generating a scale vector according to an exemplary embodiment of the present invention;

FIG. 6 depicts another exemplary display reconfiguration;

FIG. 7 is a block diagram of an exemplary computer system which can be used to implement the present invention; and FIG. 8 is a block diagram illustrating various exemplary functional units of the computer system of FIG. 7.

DETAILED DESCRIPTION

To facilitate an understanding of the present invention, it is described hereinafter with reference to an exemplary implementation in a graphical user interface of the type which employs a desktop containing objects that are represented as icons, windows and other elements. It will be appreciated that the practical applications of the invention are not limited to this particular embodiment. Rather, the invention can find utility in any situation in which it is desirable to update a display space to accommodate a change in size and/or location of a display device.

As an overview of exemplary embodiments of the present invention, reference is made to the flowchart of FIG. 2 wherein a general method for relocating display objects upon reconfiguration of a display environment is illustrated. Therein, at block 10, a move vector is determined which identifies the movement of an origin of a display device as a result of the display space reconfiguration. Those skilled in the art will appreciate that the origin of a display device can be chosen to be, for example, any pixel of the display device as long as this selection is consistent. However, for the purposes of describing exemplary embodiments of the present invention, the upper left hand corner has been selected as the origin and designated with coordinates (0,0). Next, at block 20, a scale vector is determined for each object to be relocated. The scale vector quantifies changes in relative positions between an original position of the displayed object and a new position for the displayed object on the reconfigured display device to accommodate for changes in the size of the device. Note that a display device may change size either by being physically replaced by a device of a different size or by being logically reconfigured to operate as a different size device. The move and scale vectors are added together at block 30 and then used, at block 40, to redraw the object using the relocation vector on the display in its new location. The result, when applied to each object on the relocated and/or resized display, is the visual impression to a user that the objects shown on the display device when in its original configuration have adapted to the change in display device configuration. To further explain exemplary methods and systems for placing and sizing objects in a dynamic monitor environment according to the present invention, a series of illustrative examples will now be described beginning with reference to FIG. 3.

FIG. 3 illustrates the case where the display space is reconfigured by moving one display device relative to another display device but without changing the size of the moved display device. Thus, in the original display space configuration (shown to the left side of the arrow in FIG. 3) a first display device A having a size of 1,000×1,000 pixels is abutted on its right side by a second display device B having a size of 500 pixels×500 pixels. The origin 50 of display device A is given coordinates (0, 0) while the origin 52 of display device B has coordinates (0, 1,000). Note that in the exemplary coordinate scheme used throughout this document to facilitate understanding of the present invention, coordinate pairs are provided in the form (y, x) where the positive x and y directions are shown by the "x" and "y" arrows in FIG. 3. Looking now at the reconfigured display space (to the right of the arrow in FIG. 3) the origin 50 remains unchanged since display device A has not been moved, but the origin 52 now has coordinates (0, −500) since it has been moved to the other side of display device A. The foregoing information will be captured by a data structure which keeps track of the current display configuration and any change in display configuration. For example, such a data structure could include the information set forth in Table 1 below.

| Display Device ID | (Upper Lefthand Corner, Upper Righthand Corner) |
|---|---|
| A $_{original}$ | (0, 0, 1000, 1000) |
| A $_{reconfigured}$ | (0, 0, 1000, 1000) |
| B $_{original}$ | (0, 1000, 500, 1500) |
| B $_{reconfigured}$ | (0, −500, 500, 0) |

Using the information stored in the data structure, a processor (for example that described with respect to FIG. 7 below) can determine move and scale vectors according to exemplary embodiments of the present invention as follows. Note that although display device A has not changed its configuration, the data structure can capture information for each display device in a display space. For display device A, in this example, the move and scale vectors will both be zero and the objects displayed thereon will not be moved. For display device B, the move vector is calculated by subtracting the original origin 52 of the display device B from the reconfigured origin 52 of the display device B. In this example, the move vector would be determined as: (0, −500)−(0, 1,000)=(0, −1,500). Returning to FIG. 2 for a moment, it will be recalled that the next step in this exemplary process (block 20) is to then determine a scale vector for each object to be relocated in the display space. In FIG. 3, an icon 60 was drawn on display device B in its original configuration with respect to display device A and should be redrawn as shown in the reconfigured display space to the right of the arrow. For each object that is to be relocated according to this exemplary embodiment, a corresponding scale vector should be determined if the display space reconfiguration involved resizing of the display device. However, in this example, display device B has not been resized, and accordingly, the scale vector as determined at block 20 of the flowchart of FIG. 2 would be the zero vector for any objects shown on this device including icon 60. Thus, the move vector effectively becomes the relocation vector for this example upon addition of the move vector and scale vector (i.e., the zero vector) and the icon 60 is redrawn by relocating a reference point of the icon, e.g., the upper left most point of the icon, using the relocation vector. In this case, the reference point of icon 60 would be moved by adding the coordinates of the upper leftmost pixel of icon 60 to the relocation vector (0, −1,500) and redrawn at that coordinate in the display space.

FIG. 4 illustrates another exemplary case which will further describe exemplary embodiments of the present invention. Therein, display device A having origin 60 at coordinates (0, 0) is again abutted by a 500 by 500 pixel display device B having origin 62 at location (0, 1,000). In this case, however, display device B is not moved but is instead enlarged to be the same size as display device A, e.g., 1,000×1,000 pixels. Thus, the data structure used by the processor to determine the move and scale vectors could be represented as set forth below in Table 2.

| Display Device ID | (Upper Lefthand Corner, Upper Righthand Corner) |
|---|---|
| $A_{original}$ | (0, 0, 1000, 1000) |
| $A_{reconfigured}$ | (0, 0, 1000, 1000) |
| $B_{original}$ | (0, 1000, 500, 1500) |
| $B_{reconfigured}$ | (0, 1000, 1000, 2000) |

As can be seen both pictorially in FIG. 4 and by the coordinates of $B_{original}$ and $B_{reconfigured}$ in Table 2, the origin 62 of display device B has not moved in this example unlike the origin 52 in the example described above with respect to FIG. 3. Since the origin 52 has not moved, the move vector for this example will be zero. Display device B has changed in size in this example such that the position of icon 70 is scaled so that it is displayed in a visually similar location on the reconfigured display device B. An exemplary technique for determining the scale vector which quantifies this portion of the movement for objects according to exemplary embodiments of the present invention will now be presented with reference to the flowchart of FIG. 5.

In FIG. 5, the first step for creating a scale vector for an element to be relocated is to normalize the element reference point with respect to the absolute origin (i.e., coordinates (0, 0)) of the display space if the display device has been moved at block 80. This normalization can be performed by subtracting the origin of the display device in its original configuration from the coordinates of the element reference point. The significance of this normalization step will be apparent from the subsequent discussion of the example shown in FIG. 6. Next, new horizontal and vertical coordinates for the reference point of the element to be relocated are calculated. These new coordinates can be determined using equations (1) and (2) below.

$$\text{New Horizontal Coordinate} = \text{Old Horizontal Coordinate} * \frac{\text{New Horizontal Dim.}}{\text{Old Horizontal Dim.}} \quad (1)$$

$$\text{New Vertical Coordinate} = \text{Old Vertical Coordinate} * \frac{\text{New Vertical Dim.}}{\text{Old Vertical Dim.}} \quad (2)$$

Having calculated the new coordinates for the element reference point at block 90, the process flows on to block 100 wherein these coordinates are translated back to the original display space by adding the origin subtracted during normalization to these new coordinates.

To facilitate understanding of the generation of the scaling vector according to exemplary embodiment of the present invention, an example will now be provided for the icon 70 of FIG. 4. Therein, assume that the element reference point for icon 70, e.g., the upper lefthand pixel, has the coordinates (50, 450). To calculate the new coordinates for the reference point of icon 70, the old coordinate values of the reference point and the information in Table 2 are used to calculate the new values using equations (1) and (2). Specifically:

$$\text{New Horizontal Coordinate(Icon 70)} = 450 * \frac{1000}{500} = 900$$

$$\text{New Vertical Coordinate(Icon 70)} = 50 * \frac{1000}{500} = 100$$

Thus, the new coordinates for the element reference point of icon 70 would be (100, 900) which are exactly those expected since the size of each dimension of display device B has doubled.

FIG. 6 illustrates a third exemplary case handled by exemplary embodiments of the present invention wherein both the move and the scale vectors are non-zero. For example, display device A can be, as in the earlier examples, a 1000×1000 pixel display device and display device B, in the original configuration, can be a 1000×1000 pixel device abutting the righthand side of display device A. In the reconfigured display space, display device B is now a 500×500 pixel display whose origin has moved from coordinates (0, 1000) to (0, −500). Accordingly, a data structure maintained by the processor could appear as set forth in Table 3 for the exemplary case of FIG. 6.

| Display Device ID | (Upper Lefthand Corner, Upper Righthand Corner) |
|---|---|
| $A_{original}$ | (0, 0, 1000, 1000) |
| $A_{reconfigured}$ | (0, 0, 1000, 1000) |
| $B_{original}$ | (0, 1000, 1000, 2000) |
| $B_{reconfigured}$ | (0, −500, 500, 0) |

Using a combination of the principles described above with respect to the exemplary embodiments of FIGS. 3 through 5 and the information in Table 3, the processor can determine the new coordinates for the reference point of icon 120 as follows. First, a move vector for this reconfiguration is determined. Again, the move vector is determined by subtracting the coordinates of the original point 110 from the coordinates of the reconfigured point 110. Specifically:

Move Vector=(0, −500)−(0, 1000)=(0, −1500)

Next, the scale vector is determined for each element to be placed on display device B. For example, consider icon 120 having an element reference point with coordinates (100, 1900). The scale vector for this display object would be calculated as follows. First, the reference point coordinates for this icon would be normalized with respect to the absolute origin (0, 0). Specifically:

Normalized Horizontal Coordinate (Icon 120)=1900−1000=900

Normalized Vertical Coordinate (Icon 120)=100−0=100

Thus, the normalized coordinates for Icon 120's reference point are (100, 900). The next step is to calculate the new coordinates for this reference point based on the information in Table 3 and using equations (1) and (2). Specifically, the new horizontal and vertical coordinates will be:

$$\text{New Normalized Horizontal Coordinate} = 900 * \frac{500}{1000} = 450$$

$$\text{New Normalized Vertical Coordinate} = 100 * \frac{500}{1000} = 50$$

Subsequently, as described in FIG. 2 (step 100), these coordinates are translated back into the reference frame of the original display device B by adding the origin 110 coordinates (0, 1000) as follows:

New Horizontal Coordinate=450+1000=1450

New Vertical Coordinate=50+0=50

Thus, the scale vector for the reference point of icon 120 will be (50, 1450). At this point, it is worth noting the significance of steps 80 and 100 in the exemplary flowchart of FIG. 5 for determining scale vectors according to exemplary embodiments of the present invention. For situations, such as those illustrated in FIG. 6, where an origin of a display device has moved from a positive to a negative (or negative to positive) horizontal coordinate, the absolute magnitude of the scale vector is skewed absent normalization. For the example of FIG. 6 if equations (1) and (2) for calculating new coordinates are applied without normalizing, it can be shown that the resultant relocation for the vector reference point of icon 120 would instruct the graphical user interface to redraw icon 120 somewhere in the display space controlled by display device A. Finally, the move vector and scale vector determined above are added together to obtain the relocation vector of the reference point for icon 120, i.e., (50, −50) which is used to redraw this icon in the display space now controlled by the reconfigured display device B of FIG. 6.

Although the exemplary cases portrayed in FIGS. 3, 4 and 6 involve the relocation of icon objects, those skilled in the art will appreciate that the techniques disclosed herein are exemplary of techniques which can be used to relocate any type of graphical user interface object. Window objects can also be relocated using the top left corner pixel, for example, of the window as a reference point. Moreover, although the above-described exemplary embodiments do not provide for the resizing of objects, those skilled in the art will appreciate that objects can also be resized when the display device reconfiguration involves a change in size. For example, windows can be resized using the information retained by the processor. Other types of user interface objects can also be controlled in a similar manner. For example, drawer objects can be relocated using a center point of a drawer title bar as a reference point. Placement of drawer title bars can be further controlled in accordance with the techniques set forth in U.S. patent application Ser. No. 08/435,376, entitled "System and Methods for Positioning a Drawer Title Bar on a Graphical User Interface" by Max McFarland and filed concurrently herewith, which disclosure is incorporated herein by reference. Where such techniques indicate that the drawer title bar cannot be placed in a newly configured display space, then the original window from which the drawer was created can instead be placed on the reconfigured display device.

Exemplary embodiments of the present invention have been described in terms of various visual aspects created or drawn in a display space controlled by a processor through a graphical user interface. Those skilled in the art will appreciate that such an interface can, for example, be used in conjunction with a computer such as that illustrated in FIG. 7. Therein, a personal computer is illustrated as having a box 160 which contains, among other elements, circuit boards (including a processor) associated with the computer's functions, a keyboard 180, a pointing device 200 and a monitor 220 having a display space 240. The circuit boards included in box 160 can include boards which accommodate functional units such as those illustrated by the block diagram of FIG. 8. Therein RAM 31, ROM 32, processor 34, and I/O 36 are all interconnected via system bus 38. Of course the personal computer illustrated in FIG. 7 is purely exemplary of one type of computer system in which graphical user interfaces and methods according to the present invention may be implemented. Moreover, although the present invention is described herein by way of exemplary, illustrative embodiments, some of which refer to graphical user interfaces implemented using the Macintosh® computer system as a reference for explaining the present invention, those those skilled in the art will readily appreciate that systems and methods according to the present invention can be applied to any type of display system having a user interface. Those wishing additional information with respect to the Macintosh® system are referred to *Inside Macintosh*, Vols. 1–6.

Although the present invention has been described herein by way of the foregoing exemplary embodiments, these embodiments are intended in all respects to be merely illustrative of the present invention rather than restrictive thereof. Those skilled in the art will appreciate the various modifications, combinations, alternatives, and equivalents are well within the scope of the present invention as defined by the appended claims.

I claim:

1. In a computer having at least one display device associated with a display space, a system for updating a location of a displayed object upon a change in at least one of a size and a location of said at least one display device, comprising:

a processor for retaining first information associated with a first display configuration and receiving second information associated with said change of at least one of a size and a location of said at least one display device, wherein said processor uses said first and second information to:

(a) determine a move vector which identifies a movement of an origin of said at least one display device;

(b) determine a scale vector which identifies a relative movement for said displayed object from an original position in said display space to a new position in said display space; and (c) add said move vector and scale vector to generate a relocation vector; and a graphical interface for receiving said relocation vector and using said relocation vector to redraw said displayed object on said at least one display device.

2. The system of claim 1 wherein said move vector is a zero vector when said location of said at least one display device is unchanged.

3. The system of claim 1 wherein said scale vector is a zero vector when said size of said at least one display device is unchanged.

4. The system of claim 1 wherein said graphical interface resizes said displayed object if said size of said at least one display device is changed.

5. In a computer having a graphical user interface in which objects can be displayed at different locations, a method for updating the display of an object in response to a change from a first display configuration to a second display configuration, comprising the steps of:

determining a move vector identifying movement of an origin of a display device;

determining a scale vector between a first pixel location of said object drawn on said display device in said first display configuration and a corresponding pixel location on said display device in said second display configuration;

adding said move vector and said scale vector to generate a relocation vector; and rendering said object on said display device in said second display configuration using said relocation vector.

6. The method of claim 5, wherein said step of determining a move vector further comprises the step of:

setting said move vector equal to a zero vector if said origin of said display device is the same in said first display configuration and said second display configuration.

7. The method of claim 5, wherein said step of determining a scale vector further comprises the step of:

setting said scale vector equal to a zero vector if a size of said display device is the same in said first display configuration and said second display configuration.

8. The method of claim 5, wherein said step of determining a scale vector further comprises the steps of:

normalizing coordinates of said first pixel location relative to an absolute origin by subtracting coordinates of said origin from said coordinates of said first pixel location;

calculating new coordinates using said normalized coordinates; and adding said coordinates of said origin to said new coordinates to generate said scale vector.

9. The method of claim 5, further comprising the step of:

resizing said object if said display device has changed size.

10. A method for placing an object after a change in display space configuration comprising the steps of:

rendering said object on a display device at a first reference location;

changing said display space configuration by moving said display device relative to another display device;

calculating a move vector associated with said movement of said display device by subtracting coordinates of a first origin associated with said display device from a second origin associated with said display device after said changing step; and rendering said object on said display device at a second reference location using said move vector.

11. The method of claim 10, wherein said step of changing said display space further comprises the step of:

moving said display device logically relative to said another display device.

12. A method for placing an object after a change in display space configuration comprising the steps of:

rendering said object on a display device at a first reference location;

changing said display space configuration by changing a size of said display device;

determining a scale vector associated with said change in size of said display device by multiplying original coordinates of said first reference location by a scaling factor; and rendering said object on said display device at a second reference location using said scale vector, wherein said step of determining a scale vector further comprises the steps of:

normalizing said original coordinates of said first reference location relative to an absolute origin by subtracting coordinates of an origin of said display device from said coordinates of said first reference location;

calculating new coordinates using said normalized coordinates; and adding said coordinates of said origin to said new coordinates to generate said scale vector.

13. The method of claim 12, wherein said step of changing said display space further comprises the step of:

logically resizing said display device.

14. The method of claim 12, wherein said step of changing said display space further comprises the step of:

physically resizing said display device by replacing said display device with a second display device of a different size.

* * * * *